US009851885B2

(12) United States Patent
Brinda

(10) Patent No.: US 9,851,885 B2
(45) Date of Patent: Dec. 26, 2017

(54) ELECTRONIC APPARATUS AND OPERATING METHOD THEREOF AND COMPUTER READABLE STORAGE MEDIUM

(71) Applicant: HTC Corporation, Taoyuan County (TW)

(72) Inventor: David Brinda, Bellevue, WA (US)

(73) Assignee: HTC Corporation, Taoyuan (TW)

(*) Notice: Subject to any disclaimer, the term of this patent is extended or adjusted under 35 U.S.C. 154(b) by 521 days.

(21) Appl. No.: 13/775,121

(22) Filed: Feb. 23, 2013

(65) Prior Publication Data
US 2013/0227486 A1    Aug. 29, 2013

Related U.S. Application Data

(60) Provisional application No. 61/602,621, filed on Feb. 24, 2012.

(51) Int. Cl.
G06F 3/0482 (2013.01)
G06F 3/0485 (2013.01)
G06F 3/0488 (2013.01)

(52) U.S. Cl.
CPC .......... *G06F 3/0485* (2013.01); *G06F 3/0482* (2013.01); *G06F 3/0488* (2013.01)

(58) Field of Classification Search
CPC ..... G06F 3/0482; G06F 3/0485; G06F 3/0488
See application file for complete search history.

(56) References Cited

U.S. PATENT DOCUMENTS 7,024,491 B1 * 4/2006 Hanmann ......... G06F 17/30575
                                                455/412.1
7,469,381 B2   12/2008 Ording
2004/0155908 A1 * 8/2004 Wagner ............... G06F 3/04817
                                                715/854

(Continued)

FOREIGN PATENT DOCUMENTS

CN    101384047    3/2009
CN    102138123    7/2011
EP    2034399      3/2009

OTHER PUBLICATIONS

"UITableViewController pull to refresh with a frozen header", Internet discussion retrieved from http://stackoverflow.com/questions/13544226/uitableviewcontroller-pull-to-refresh-with-a-frozen-header, relied upon portions published on and before Nov. 25, 2012. Document with revision history attached, 7 pages.*

(Continued)

Primary Examiner — Amy M Levy
Assistant Examiner — Patrick Ramsey
(74) Attorney, Agent, or Firm — JCIPRNET

(57) ABSTRACT

An electronic apparatus and an operating method thereof and a computer readable storage medium are provided. The electronic apparatus with a touch screen display executes the following steps: a list of scrollable items on the touch screen display is displayed; a movement of an object on or near the touch screen display is detected; in response to an edge of the list being reached, one or more items in a first direction is moved to display one or more gaps, wherein each gap is between the adjacent items and no gap is formed outside of the edge of the list; and the one or more items in a second direction is moved until the one or more gaps are no longer displayed.

10 Claims, 21 Drawing Sheets

(56) References Cited

U.S. PATENT DOCUMENTS

| | | | |
|---|---|---|---|
| 2007/0146337 A1 | 6/2007 | Ording et al. | |
| 2009/0073194 A1* | 3/2009 | Ording | 345/672 |
| 2010/0199180 A1* | 8/2010 | Brichter | G06F 3/0482 715/702 |
| 2011/0001709 A1 | 1/2011 | Wang | |
| 2011/0010659 A1* | 1/2011 | Kim | G06F 3/0485 715/784 |
| 2011/0090255 A1* | 4/2011 | Wilson | G06F 3/04817 345/647 |
| 2011/0138329 A1* | 6/2011 | Wells et al. | 715/830 |
| 2012/0218207 A1* | 8/2012 | Sato | G06F 3/04842 345/173 |
| 2012/0278755 A1* | 11/2012 | Lehmann | G09G 5/34 715/784 |
| 2013/0002707 A1* | 1/2013 | Jakab | G09G 5/34 345/619 |
| 2013/0063383 A1* | 3/2013 | Anderssonreimer | G06F 1/1626 345/173 |
| 2013/0212530 A1* | 8/2013 | Takase | G06F 3/0488 715/815 |
| 2014/0215341 A1* | 7/2014 | Fratti | G06F 17/30056 715/730 |

OTHER PUBLICATIONS

Google.com results for "define: list", retrieved on Mar. 19, 2017, 6 pages.*

Cocoanetics, "How to make a Pull-To-Reload TableView just like Tweetie 2", www.archive.org, Dec. 4, 2010 (Dec. 4, 2010), XP002699297, retrieved from the Internet: URL: http://web.archive.org/web/20101204054013/http://www.cocoanetics.com/2009/12/how-to-make-a-pull-to-reload-tableview-just-like-tweetie-2/ [retrieved on Jun. 21, 2013], p. 1-p. 10.

"Office Action of European Counterpart Application", dated Jul. 4, 2013, p. 1-p. 4.

Five frames retrieved from http://www.youtube.com/watch?v=3MBr8PqxX8o, Sony PS Vita Review, YouTube, Feb. 2012, 15:29-15:33.

"Office Action of European Counterpart Application", dated Feb. 25, 2014, p. 1-p. 6.

"Office Action of China Counterpart Application", dated Jul. 27, 2015, p. 1-p. 9.

"Office Action of China Counterpart Application", dated Jun. 8, 2016, p. 1-p. 11.

* cited by examiner

ELECTRONIC APPARATUS AND OPERATING METHOD THEREOF AND COMPUTER READABLE STORAGE MEDIUM

CROSS-REFERENCE TO RELATED APPLICATION

This application claims the priority benefits of U.S. provisional application Ser. No. 61/602,621, filed on Feb. 24, 2012. The entirety of the above-mentioned patent applications is hereby incorporated by reference herein and made a part of this specification.

BACKGROUND

With the rapid progress of information technologies in recent years, information products like cell phones, computers and personal digital assistant (PDA) are very common. These products satisfy various requirements of people, and make people become more and more dependent on information products. Nowadays, the information products have become an important part of people's life.

With constantly development of electronic technologies and manufacturing techniques, functionalities of information products are correspondingly innovated as well. More and more electronic apparatuses are disposed with a touch screen, such that users can operate the electronic apparatus via the touch screen. For example, users may perform operations by touching the touch screens with fingers.

SUMMARY

The present disclosure provides an electronic apparatus and operation method thereof and a computer readable storage medium to move one or more items of a list.

Specifically, the present application provides a method includes the following steps executed at a computing device with a touch screen display. Display a list of scrollable items on the touch screen display. Detect a movement of an object on or near the touch screen display. In response to an edge of the list being reached, move one or more items in a first direction to display one or more gaps, wherein each gap is between adjacent items and no gap is formed outside of the edge of the list. Move one or more items in a second direction until the one or more gaps are no longer displayed.

In addition, the present application provides an apparatus, including a touch screen display, one or more processors, a memory and one or more programs. The one or more programs are stored in the memory and configured to be installed and executed by the one or more processors, and the one or more programs includes a plurality of instructions to execute following steps. Display a list of scrollable items on the touch screen display. Detect a movement of an object on or near the touch screen display. In response to an edge of the list being reached while the movement of the object is still detected on or near the touch screen display, move one or more items in a first direction to display one or more gaps, wherein each gap is between adjacent items and no gap is formed outside of the edge of the list. In response to detecting that the movement of the object is no longer on or near the touch screen display, move the one or more items in a second direction until the one or more gaps are no longer displayed.

The present application further provides an apparatus, including a touch screen display, one or more processors, a memory and one or more programs. The one or more programs are stored in the memory and configured to be installed and executed by the one or more processors, and the one or more programs includes a plurality of instructions to execute following steps. Display a list of scrollable items on the touch screen display. In response to detecting a movement of the object, move the list of the items in a first direction. In response to an edge of the list being reached, move one or more items in the first direction to display one or more gaps, wherein each gap is between adjacent items and no gap is formed outside of the edge of the list. Move the one or more items in a second direction until the one or more gaps are no longer displayed.

The present application provides a computer readable storage medium having stored therein instructions, which when executed by a device with a touch screen display, making the device execute the aforementioned steps and functionalities.

According to the above descriptions, the items are moved according to the movement of the object and gaps are displayed between items. Next, return the moved items to original places and no gap would be displayed. Hence, when the list is being moved, one or more items are simultaneously moved instead of moving the whole list at once.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DESCRIPTION OF THE EXAMPLES

Figure 1:
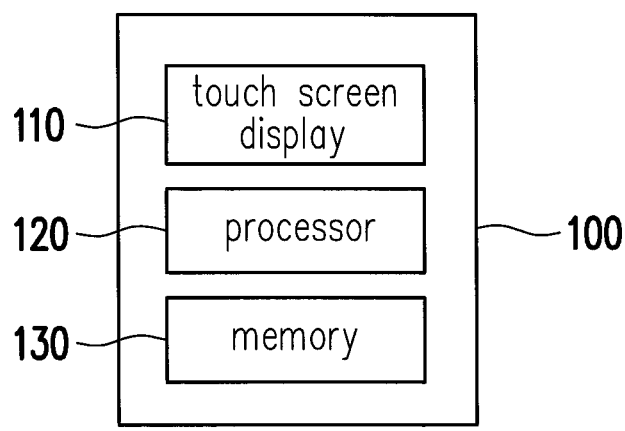
FIG. 1 is a block diagram of an electronic apparatus according to some examples of the disclosure.

FIG. 1 is a block diagram of an electronic apparatus according to some examples of the disclosure. Referring to FIG. 1, the electronic apparatus 100 includes a touch screen display 110, a processor 120 and a memory 130. The electronic apparatus 100 can be, for example, a cell phone, a smartphone, a personal computer, a laptop, a tablet, a navigation device, or a video game machine, which is not limited thereto.

The touch screen display 110 can be, for example, a capacitive screen, a resistance screen or a wave screen. The electronic apparatus 100 receives users' operation through the touch screen display 110 to execute the corresponding functions.

The processor 120 can be, for example, a central processing unit (CPU), a microprocessor, etc., which is configured for executing the hardware, firmware and the data of software.

The memory 130 can be, for example, a non-volatile memory (NVM), a dynamic random access memory (DRAM) or a static random access memory (SRAM), etc. Herein, there are one or more programs stored in the memory 130 would be executed by the processor 120 after the programs being installed. The programs include a plurality of instructions, and the processor 120 may perform a plurality of steps via the instructions. In some examples, the electronic apparatus 100 only includes one processor 120. In some examples, the electronic apparatus 100 includes a plurality of processors to execute the programs being installed, though the disclosure is not limited therein.

Figure 2:
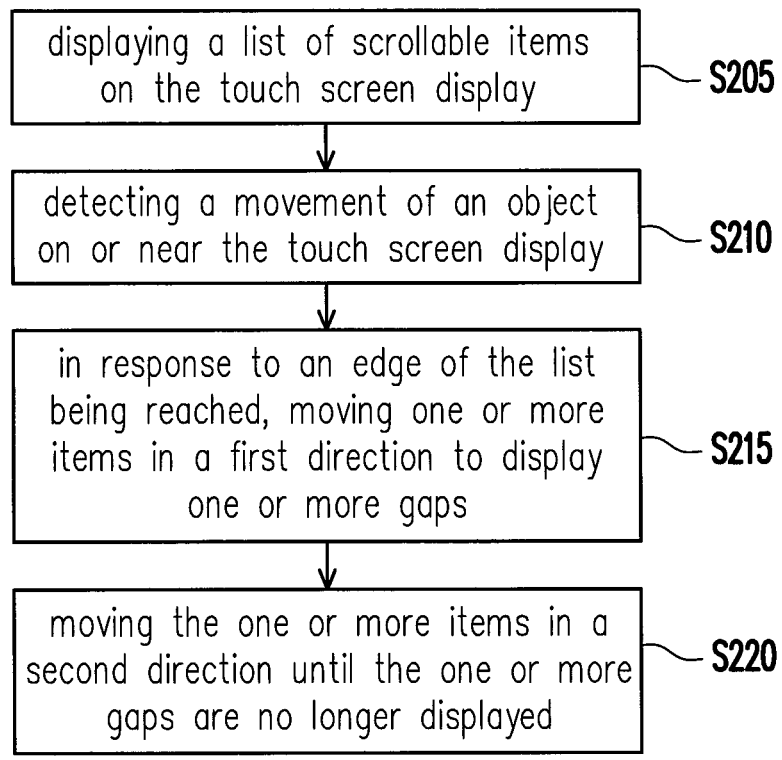
FIG. 2 is a flowchart of a method of scrolling a list according to some examples of the disclosure.

FIG. 2 is a flowchart of a method of scrolling a list according to some examples of the disclosure. The method provides a visual feedback to a user that an edge of the list has been reached. While the method described below includes a number of operations that appear to occur in a specific order, it should be apparent that the method can include more or fewer operations, which can be executed serially or in parallel (e.g., using parallel processors or multi-threading environment).

In step S205, a list of scrollable items is displayed on a touch screen display of a device. In some examples, the list of scrollable items is a list of emails, a list of instant message conversations, a list of phone numbers, a list of contact information, a list of call history, a list of missed calls, a list of labels, a list of email folders, a list of email addresses, a list of physical addresses, a list of ringtones, a list of album names, a list of bookmarks, or a list of files (e.g., document files, music files, or video files), though the disclosure is not limited therein. The device that displays the list of scrollable items can be a portable multifunction device, such as a mobile phone, though the disclosure is not limited therein.

Next, in step S210, a movement of an object is detected on or near the touch screen display. In some examples, the object is, for example, a finger or a stylus.

Next, in step S215, in response to an edge of the list being reached, one or more items are moved in a first direction to display one or more gaps. Herein, each gap is between adjacent items, and no gap is formed outside of the edge of the list. In some examples, the first direction can be a vertical direction, a horizontal direction or a diagonal direction. In some examples, the first direction can be along an x, y, or z-axis in a list implemented by 3D motion. In some examples, the list has a first item and a last item and the edge of the list is either the first item or the last item. The edge of the list is, for example, the edge of the first item or the last item in the list, and the edge does not adjoin other item. In some examples, the first item is a title bar, a search bar, or a digital image. In some examples, the gaps are visually distinct from the items, and therefore a visual effect that pulls away the adjacent items can be generated by the gaps. For example, the visual distinctions between the gaps and the items can be implemented by using different colors, which can be black, gray, white or a solid color. In some example, not all adjacent items have a gap in between. In some examples, the method shown in FIG. 2 further comprises a step of detecting the object at an initial location corresponding to an initial item. In step S215, the one or more items are moved in the first direction to display one or more gap only between the adjacent items located between the first item and the initial item.

In some examples, when the processor 120 detects the movement of the object, each of the items or part of the items is respectively moved in the first direction, such that gaps between the adjacent items are generated. For example, at least one item would move in the first direction, such that a gap is generated between the item moving in the first direction and the previous adjacent item. Or, all of the items (except the first item near the edge of the list) move in the first direction, such that a gap is generated between each of the items and its previous adjacent item. Or, only part of the items moves in the first direction, such that a gap is generated between the items moving in the first direction and its previous adjacent item. The number of the items moving in the first direction is not limited herein.

Next, in step S220, the one or more items are moved in a second direction until the one or more gaps are no longer displayed. That is, the items are moved in the second direction, so as to make the gaps between adjacent items disappear and return the items to the status of closely disposed. In some examples, the second direction is opposite to the first direction. For example, if the first direction is an upward direction, the second direction is a downward direction. In some examples, no additional gap other than the one or more gaps is displayed while moving the one or more items in the second direction. In some examples, in step S220, one or more additional gaps between the adjacent items located between the initial item and a last item of the list are displayed while moving the one or more items in the second direction, and the one or more items are moved in the second direction until the one or more gaps and the one or more additional gaps are no longer displayed. In some examples, the one or more items are moved one by one in the second direction.

In some examples, in step S215, in response to an edge of the list being reached while the object is still detected on or near the touch screen display, the one or more items are moved in the first direction to display the one or more gaps. In some example, in step S220, in response to detecting that the object is no longer on or near the touch screen display, the one or more items are moved in the second direction until the one or more gaps are no longer displayed. In some examples, in step S215 and step S220, the movements of the one or more items in the first and second direction are imitation of a spring motion.

FIGS. 3A-3E are schematic diagrams illustrating moving items according to some examples of the present disclosure. In this example, the processor 120 detects an initial item corresponding to the initial location where the finger (object) locates among the items, so as to respectively display one or more gaps between adjacent items located between the first item and the initial item. In addition, when the items are moved in the second direction, no additional gaps would be displayed between adjacent items located between the initial item and the last item (i.e., the other edge).

In this example, a list 310 is displayed on the touch screen display 110. The list 310 includes scrollable items $I_1$-$I_6$, where the item $I_1$ is the first item in the list 310. The list 310 is a mail list, which includes a plurality of items (e.g., a plurality of mails). In the example, an edge B of the list 310 (e.g., the upper edge of the first item $I_1$) has been reached before the user touches the touch screen display 110.

Figure 3A:
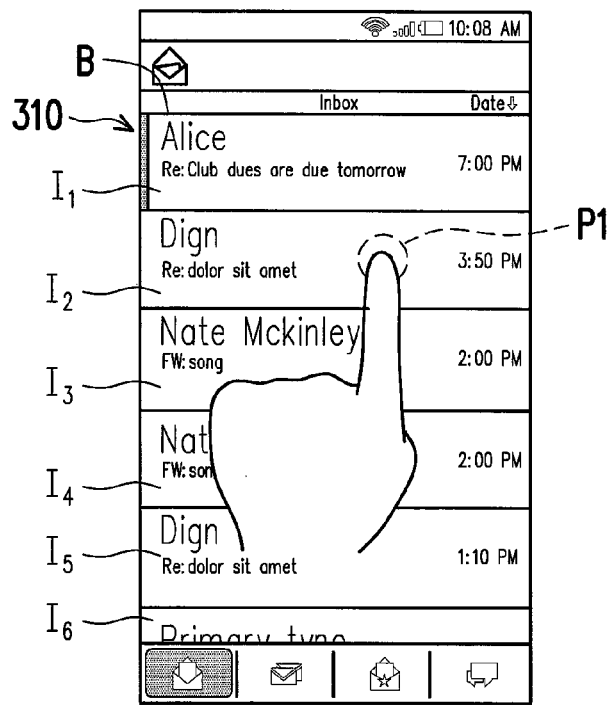
FIGS. 3A-3E are schematic diagrams illustrating moving items according to some examples of the present disclosure.

In FIG. 3A, the user initiates a touch from the item $I_2$ on or near the touch screen display 110 with a finger, and the processor 120 detects an object (i.e., the finger) at an initial location P1 on or near the touch screen display 110, which corresponds to the initial item $I_2$. In other examples (FIGS. 4A-4D), the initial item can be the items $I_1$, $I_3$-$I_6$, or any other items displayed in the touch screen display 110.

Figure 3B:
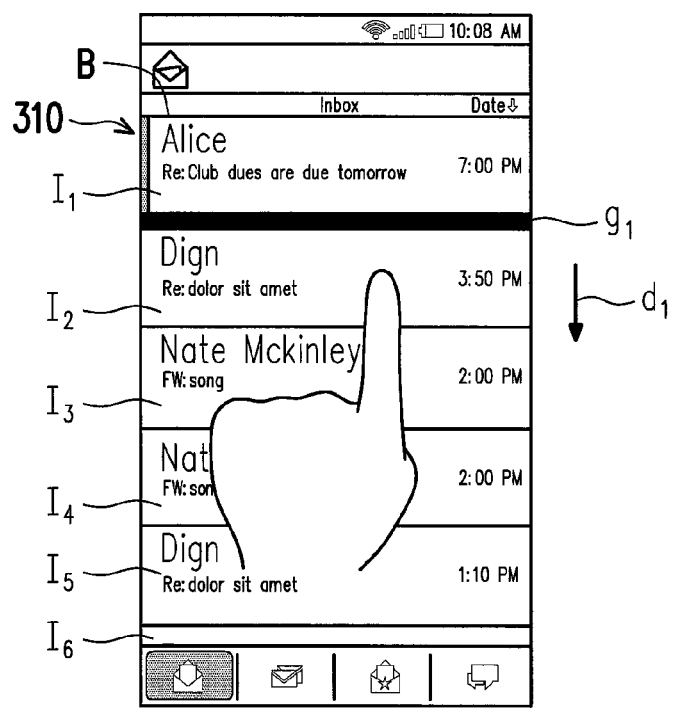
Figure 3C:
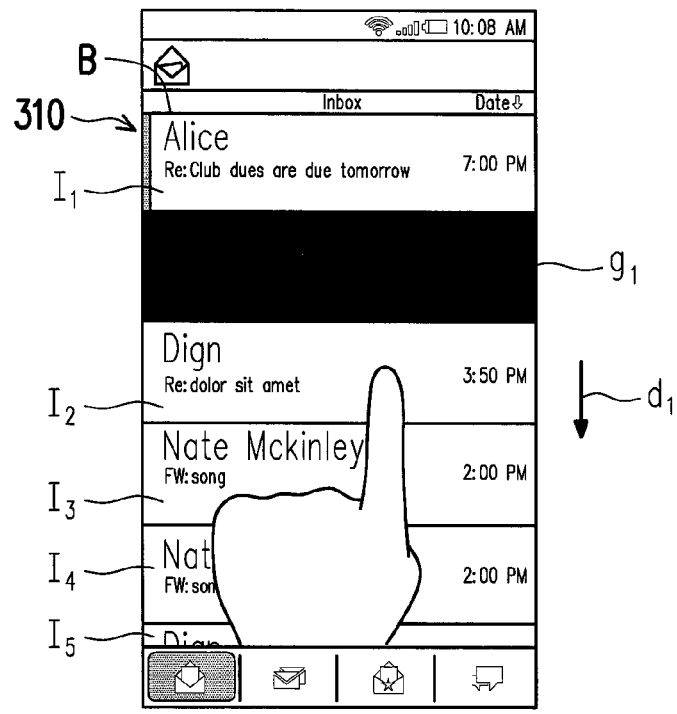

FIGS. 3B and 3C show the movement of the items $I_2$-$I_6$ in response to a movement of the finger. In FIG. 3B, when the user's finger drags down on the touch screen display 110, the processor 120 detects the movement of the object (e.g., the finger) of dragging down from the initial location P1. Because the edge B of the list 310 has been reached before the user touches the touch screen display 110, the processor 120 moves the items $I_2$-$I_6$ in a first direction $d_1$ to display a gap $g_1$ between the adjacent items $I_1$ and $I_2$, which are located between the first item $I_1$ and the initial item $I_2$. Since the first item $I_1$ does not move, no gap is formed outside of the edge B of the list 310. In this example, the first direction $d_1$ is a downward direction. In FIG. 3C, the items $I_2$-$I_6$ continue to move in the first direction $d_1$ in response to the dragging down movement of the object on or near the touch screen display 110. The height of the gaps $g_1$ increases as the items $I_2$-$I_6$ continues to move in the first direction $d_1$. Herein, the first item $I_1$ still does not move and no gap is formed outside of the edge B of the list 310.

Figure 3D:
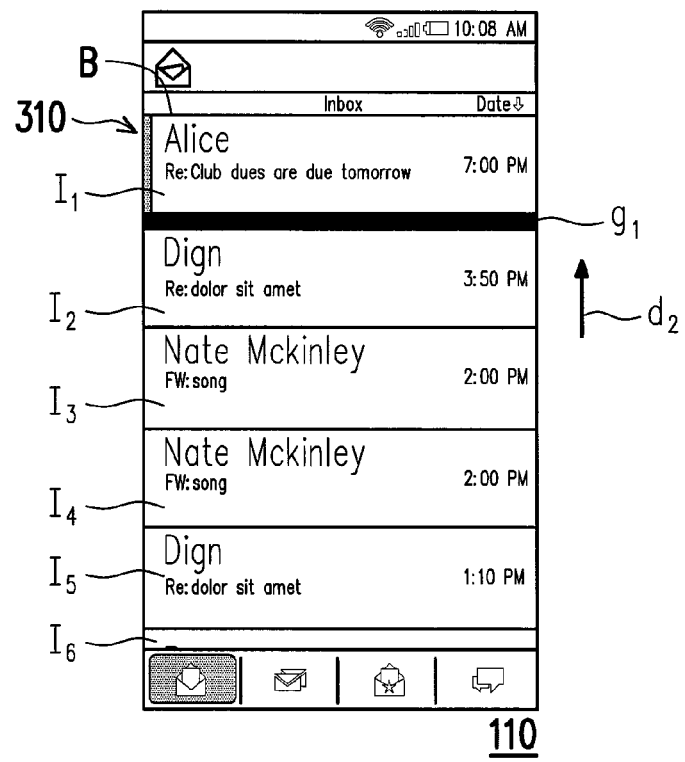
Figure 3E:
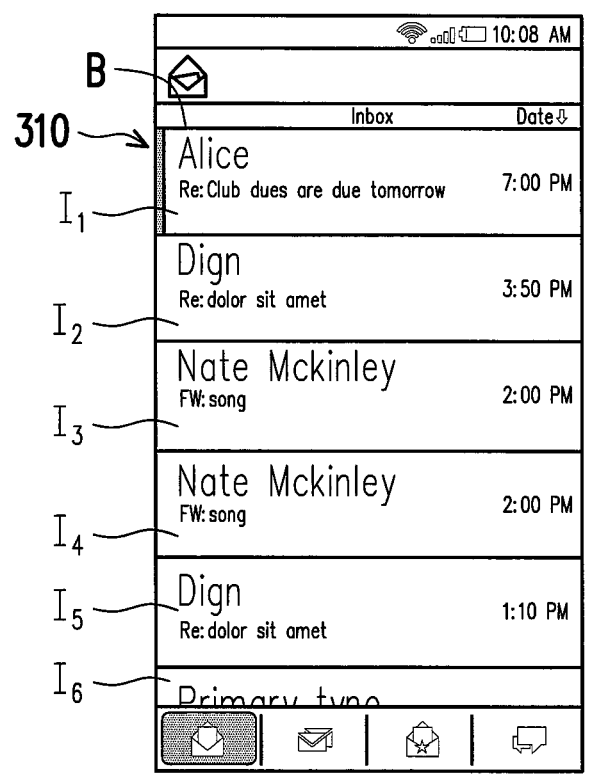

FIG. 3D-3E show the movement of the items $I_2$-$I_6$ in response to detecting that the object is no longer on or near the touch screen display 110. After the finger leaves the touch screen display 110 (i.e., is no longer on or near the touch screen display 110), the items $I_2$-$I_6$ move back in a second direction $d_2$ (FIG. 3D) until the gap $g_1$ is no longer displayed (FIG. 3E). In this example, the second direction $d_2$ is an upward direction opposite to the first direction $d_1$ (i.e., the downward direction).

FIGS. 4A-4D are schematic diagrams illustrating movement of the items according to some examples of the present disclosure. In this example, an edge B of the list 310 (e.g., the upper edge of the first item $I_1$) has been reached before user touches the touch screen display 110.

Figure 4A:
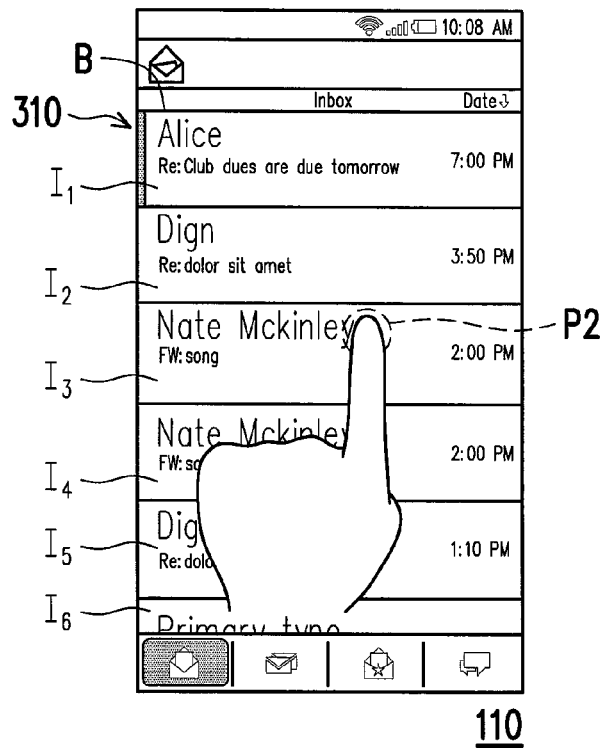
FIGS. 4A-4D are schematic diagrams illustrating moving items according to some examples of the present disclosure.

In FIG. 4A, the user initiates a touch from an item $I_3$ on or near the touch screen display 110 with a finger, and the processor 120 detects an object (i.e., the finger) at an initial location P2 on or near the touch screen display 110 corresponding to the initial item $I_3$.

Figure 4B:
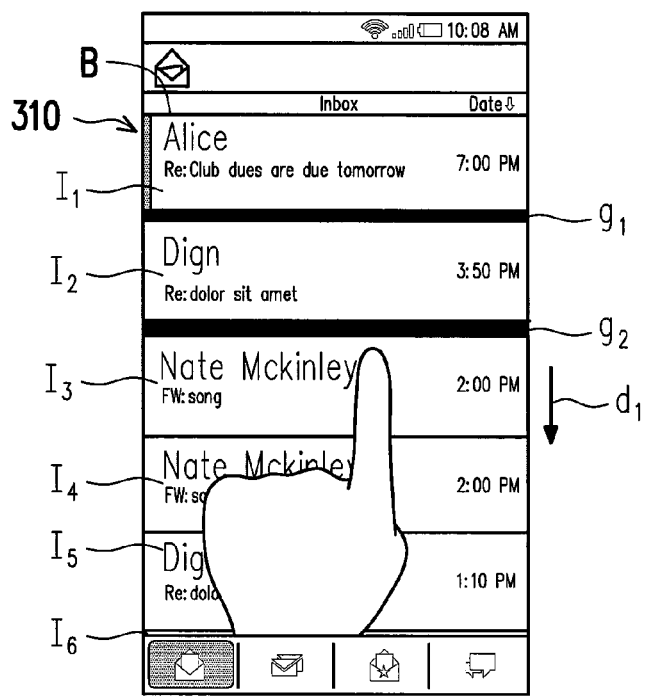

FIG. 4B shows the movement of the items $I_2$-$I_6$ in response to detecting a movement of the finger. In FIG. 4B, when the user's finger drags down on the touch screen display 110, the processor 120 detects the dragging down movement of the object (e.g., the finger) from the initial location P2. Because the edge B of the list 310 has been reached before the user touches the touch screen display 110, the processor 120 moves the items $I_2$-$I_6$ in a first direction $d_1$ to display a gap $g_1$ between the adjacent items $I_1$ and $I_2$ and a gap $g_2$ between the adjacent items $I_2$ and $I_3$. The adjacent items $I_1$-$I_2$ and $I_2$-$I_3$ are located between the first item $I_1$ and the initial item $I_3$. Since the first item $I_1$ does not move, no gap is formed outside of the edge B of the list 310. In this example, the first direction $d_1$ is a downward direction. In this example, the gap $g_2$ is formed earlier than the gap $g_1$ (not shown), and the heights of the gaps $g_1$ and gaps $g_2$ are different (e.g., the height of the gap $g_1$ is smaller than the height of the gap $g_2$). In some examples, the gaps $g_1$ and gaps $g_2$ are formed at the same time, and the heights of the gaps $g_1$ and gaps $g_2$ are the same all the time. In this example, no additional gap would be displayed between adjacent items located between the initial item $I_3$ and the last item (not shown). That is, the items $I_3$-$I_6$ and other subsequent items remain closely disposed.

Figure 4C:
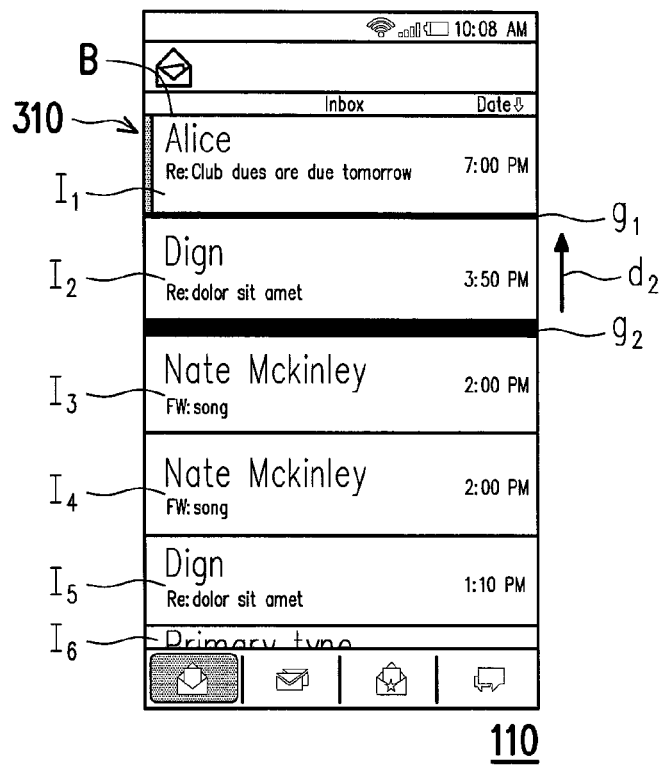
Figure 4D:
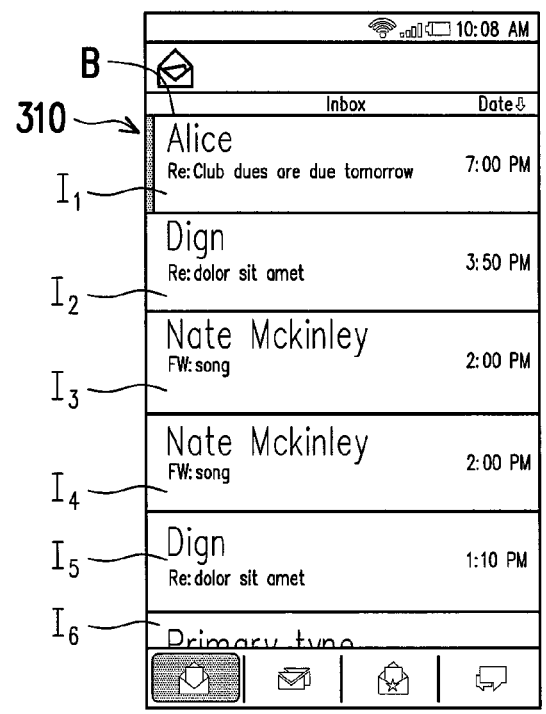

FIG. 4C-4D show the movement of the items $I_2$-$I_6$ in response to the detection of the finger leaving the touch screen display 110. After the finger leaves the touch screen display 110, the items $I_2$-$I_6$ move back in a second direction $d_2$ (FIG. 4C) until the gaps $g_1$ and $g_2$ are no longer displayed (FIG. 4D). In this example, the second direction $d_2$ is an upward direction opposite to the first direction $d_1$ (i.e., the downward direction). In this example, the heights of the gaps $g_1$ and gaps $g_2$ are different (e.g., the height of the gap $g_1$ is smaller than the height of the gap $g_2$), and the gap $g_1$ disappears earlier than the gap $g_2$ (not shown). In some examples, the heights of the gaps $g_1$ and gaps $g_2$ are the same all the time, and the gaps $g_1$ and gaps $g_2$ disappear at the same time, though the disclosure is not limited therein.

In this example, the initial item $I_3$ can be regarded as a reference to separate the items into a first part and a second part of items, and the second part can be viewed as a whole part. That is, the first part of items includes the items $I_1$-$I_2$ located between the first item $I_1$ and the initial item $I_3$, and the second part of the items includes the items $I_3$-$I_6$ located between the initial item $I_3$ and the last item and the subsequent items of the items $I_3$-$I_6$. The items $I_1$-$I_2$ of the first part of items and the second part of items (which can be viewed as a whole part) in the first direction $d_1$ are pulled away individually to generate the gaps $g_1$ and $g_2$ between adjacent items. When the finger is detected to be no longer on or near the touch screen display 110, the pulled away items $I_1$-$I_2$ and the second part of the items are moved individually in the second direction $d_2$, such that the pulled away items can be connected with the previous items.

Figure 5A:
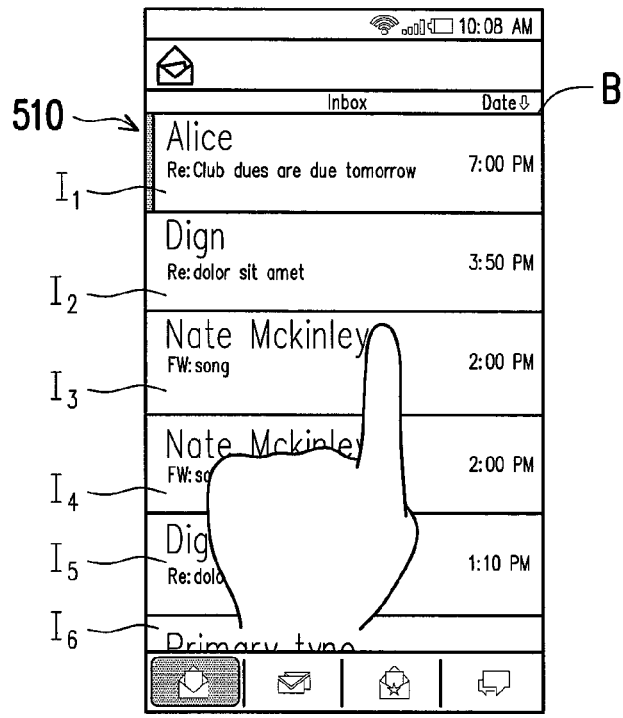
FIGS. 5A-5D are schematic diagrams illustrating moving items according to some examples of the present disclosure.
Figure 5B:
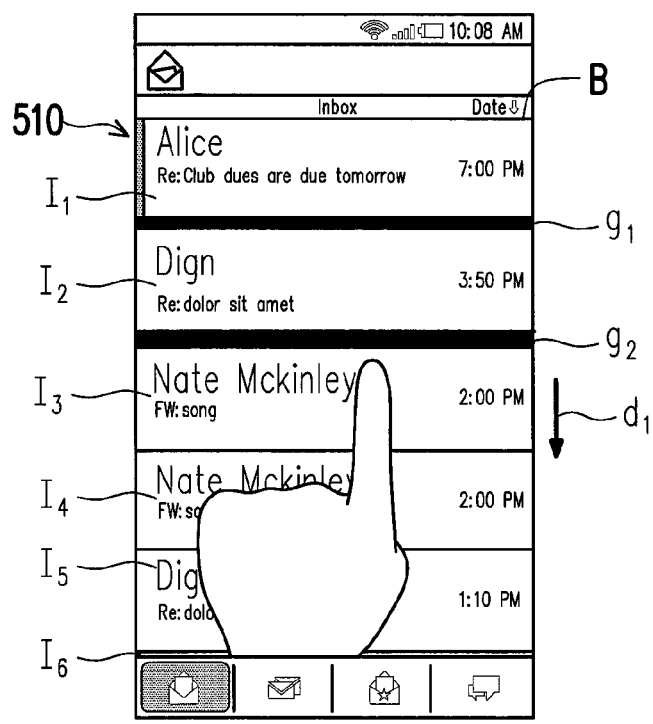

FIGS. 5A-5D are schematic diagrams illustrating movement of the items according to some examples of the present disclosure. The description of FIGS. 5A-5B is the same as the description of FIGS. 4A-4B and is thus omitted for brevity.

Figure 5C:
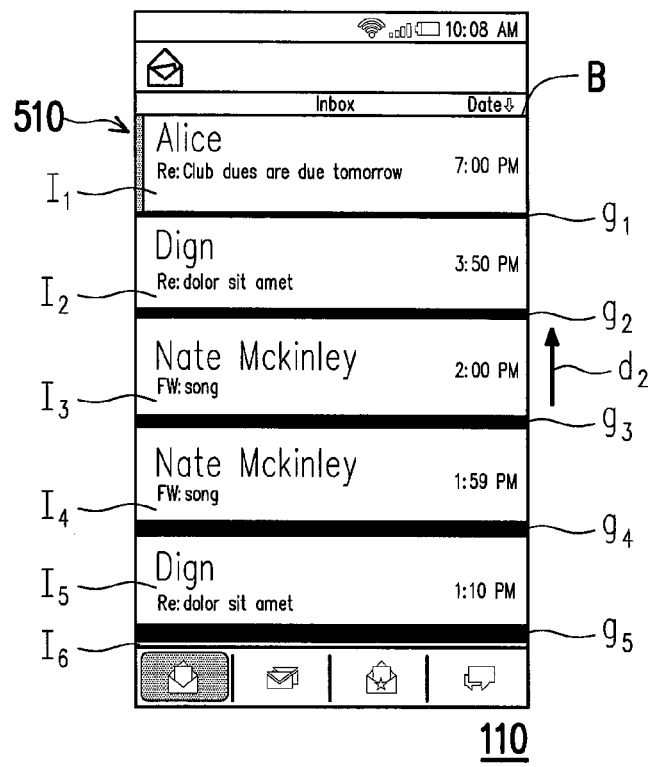
Figure 5D:
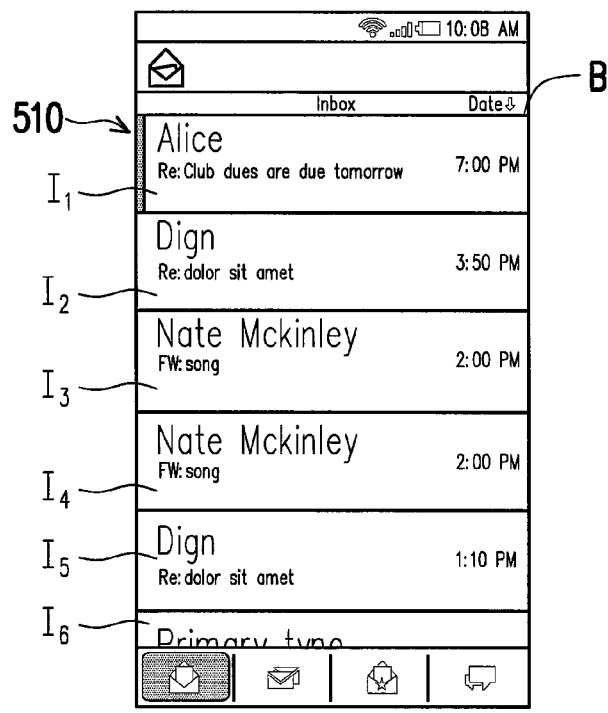

When the finger leaves the touch screen display 110, the processor 120 would move the items $I_2$-$I_3$ in a second direction $d_2$ (FIG. 5C) until the gaps $g_1$-$g_2$ are no longer displayed (FIG. 5D). In this example, the second direction $d_2$ is an upward direction. Moreover, the items located between the initial item $I_3$ and the last item (i.e., the items $I_3$-$I_6$ and their subsequent items) are moved in the second direction $d_2$, such that gaps (such as the gaps $g_3$-$g_5$) can be respectively displayed between the adjacent items located between the initial item $I_3$ and the last item (FIG. 5C). And, the items $I_3$-$I_6$ and their subsequent items are continuously moved in the second direction $d_2$ until the gaps between the items located between the initial item $I_3$ and the last item are no longer displayed (FIG. 5D).

In this example, additional gaps would be displayed between the adjacent items located between the initial item $I_3$ and the last item. That is, the displayed items $I_3$-$I_6$ can spring back in the second direction $d_2$ like a spring motion.

Figure 6A:
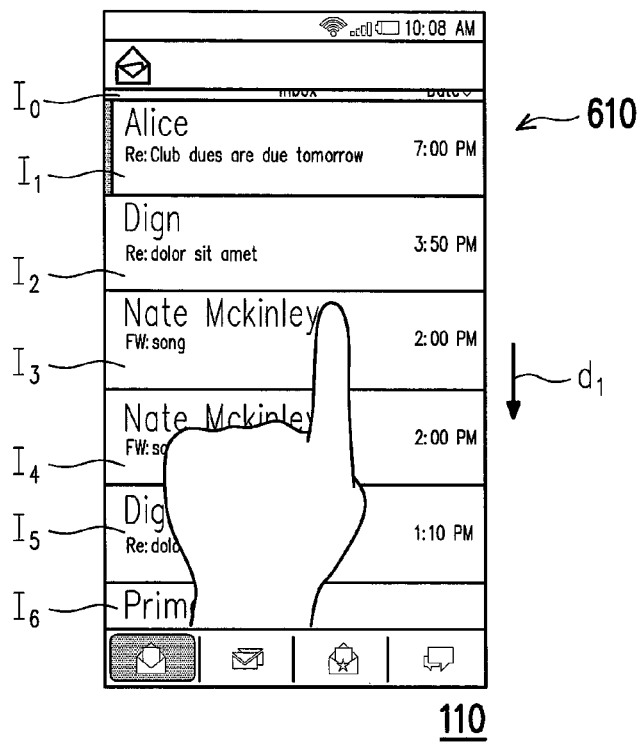
FIGS. 6A-6F are schematic diagrams of moving items according to some example of the present disclosure.
Figure 6B:
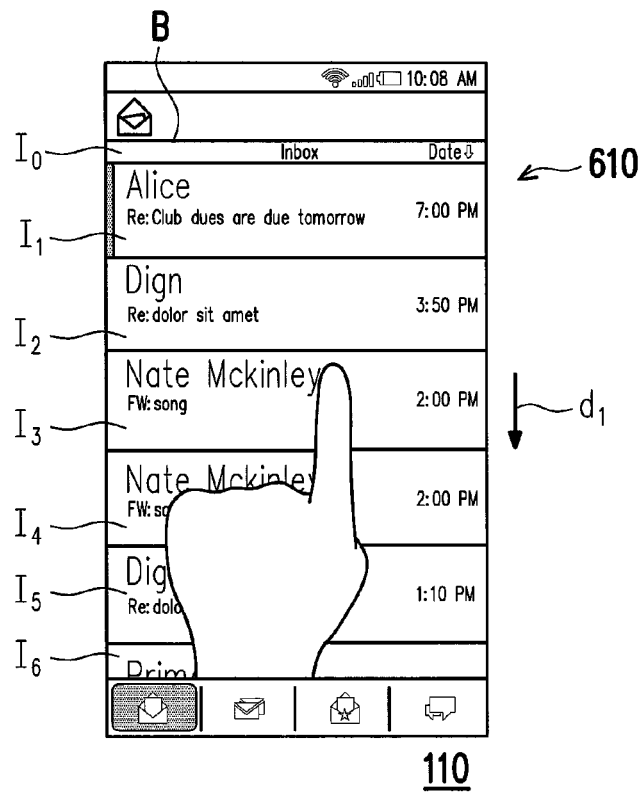
Figure 6C:
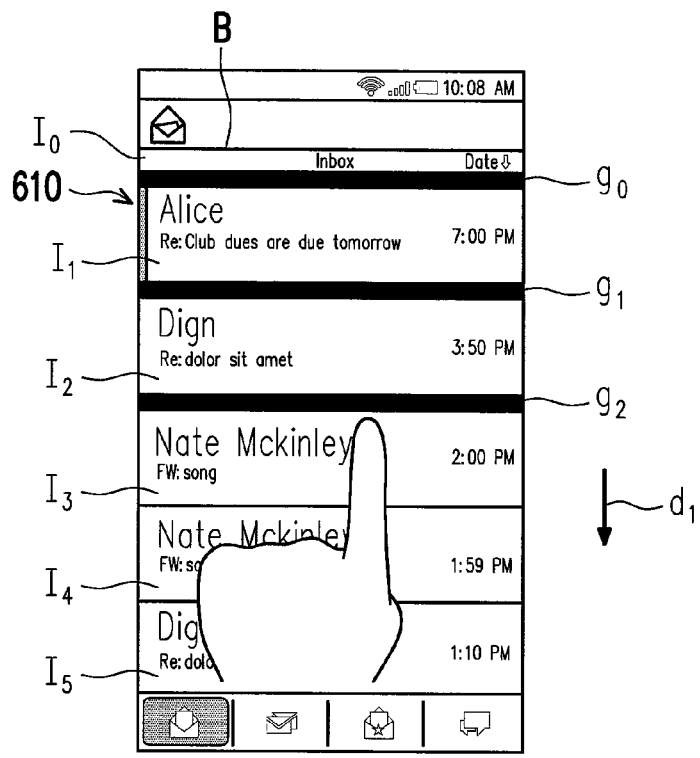
Figure 7A:
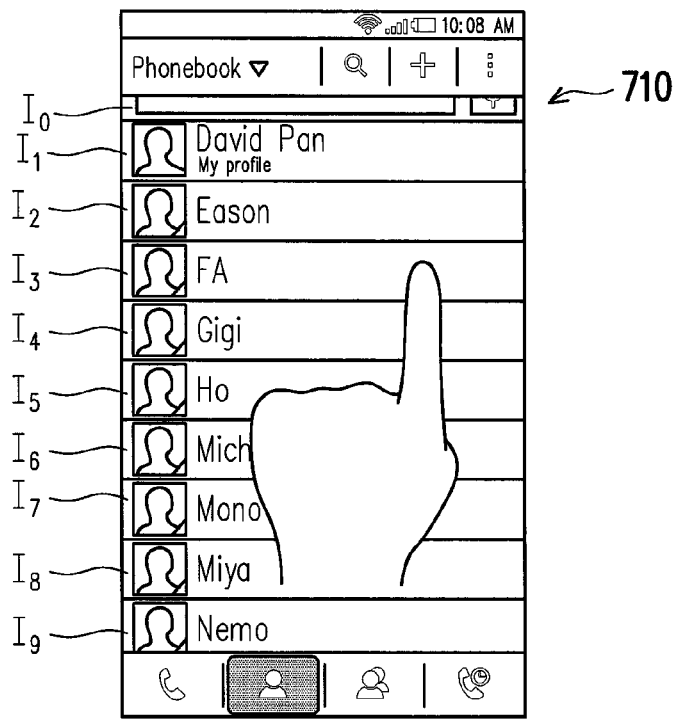
FIGS. 7A-7C are schematic diagrams of list with a search bar according to some examples of the present disclosure.
Figure 7B:
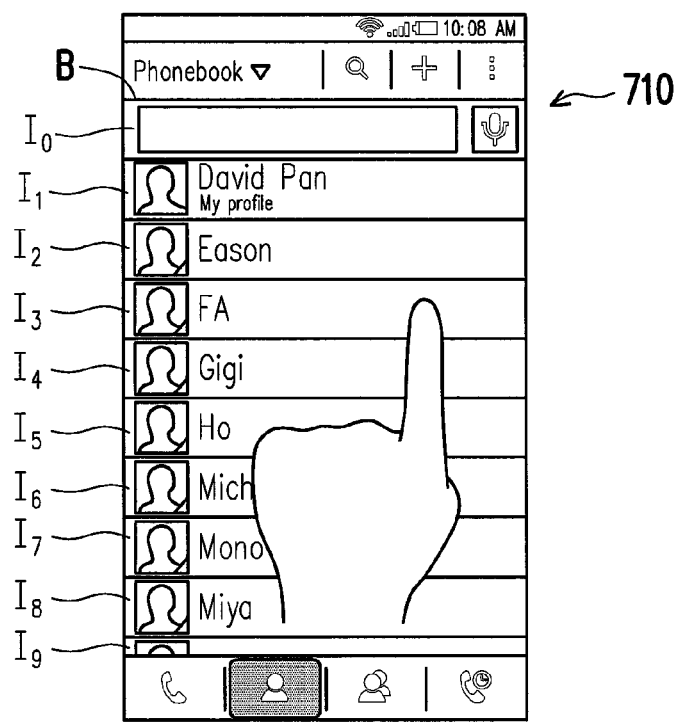
Figure 7C:
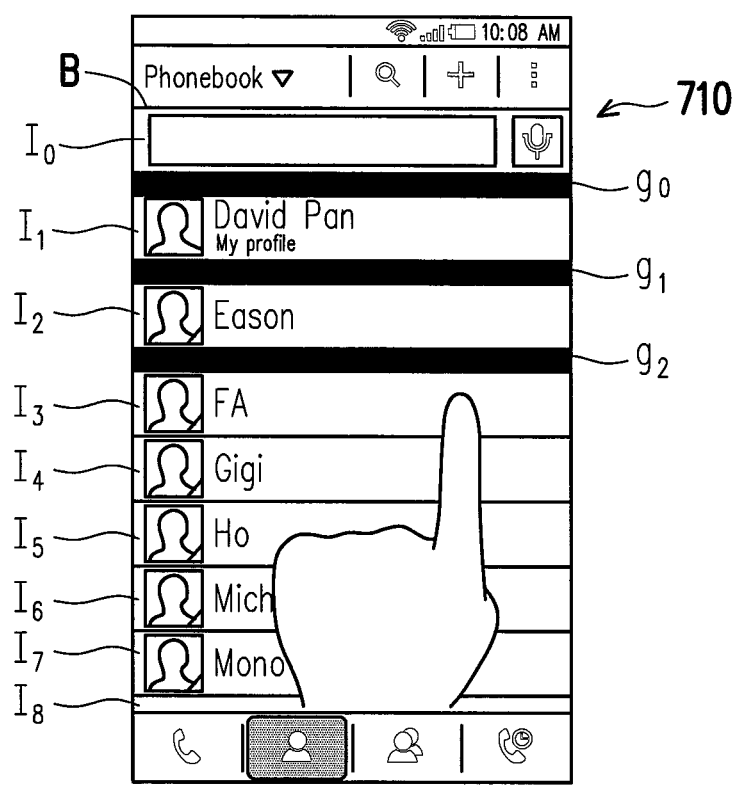
Figure 8A:
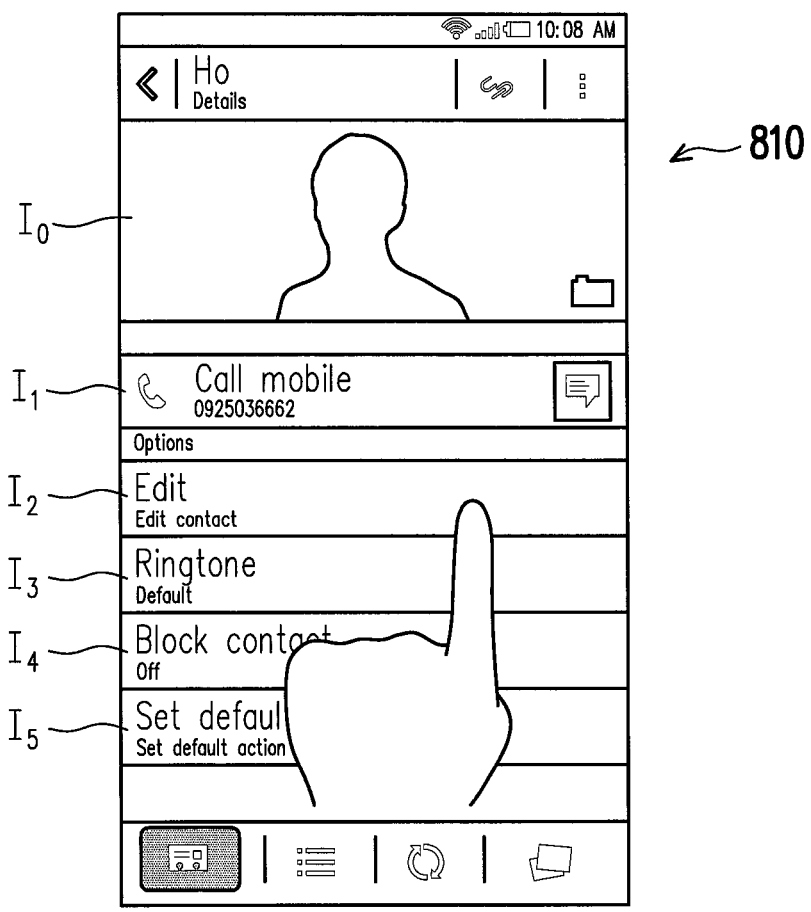
FIGS. 8A-8B are schematic diagrams of list with a digital image according to some examples of the present disclosure.
Figure 8B:
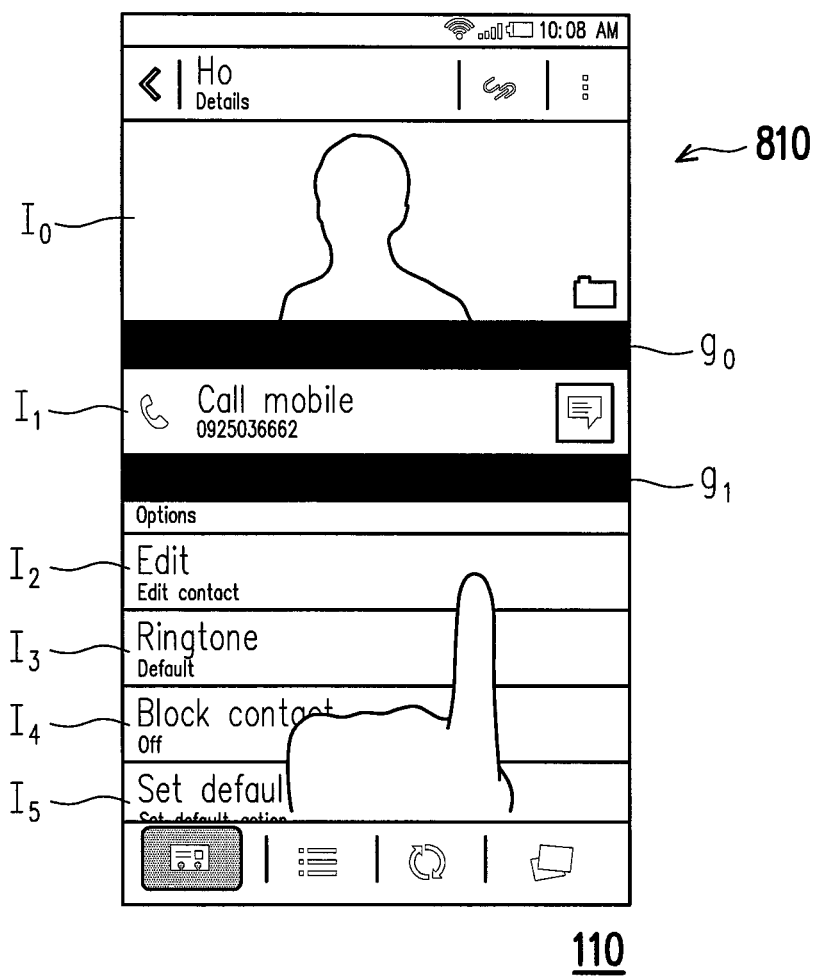

In some examples, the first item of the list may be title bar (FIGS. 6A-6C and FIGS. 6D-6F), a search bar (FIGS. 7A-7C) or a digital image (FIGS. 8A-8B). FIGS. 6A-6C and FIGS. 6D-6F are schematic diagrams illustrating moving items according to some examples of the present disclosure. Referring to FIGS. 6A-6C, the first item $I_0$ of the list 610 is the title bar. In FIG. 6A, the edge of the list 610 does not reach before the user touches the touch screen display 110. In response to detecting a movement of an object (e.g., a finger), the whole list 610 would be moved to display the edge B of the list 610, as shown in FIG. 6B.

In FIG. 6C, in response to the edge B of the list 610 being reached while the finger (object) is still detected on or near the touch screen display 110, e.g. the finger generates a movement of sliding downward, the gaps $g_0$-$g_2$ are respectively displayed between adjacent items which are located between the first item $I_0$ and the initial item $I_3$ but no gap is formed outside of the edge B of the list 610. When the finger leaves the touch screen display 110, the processor 120 would move the items $I_1$-$I_6$ in the second direction which is opposite to the first direction $d_1$ until the gaps $g_0$-$g_2$ are no longer displayed, and the movement of the items can be understood via FIGS. 4C-4D.

Figure 6D:
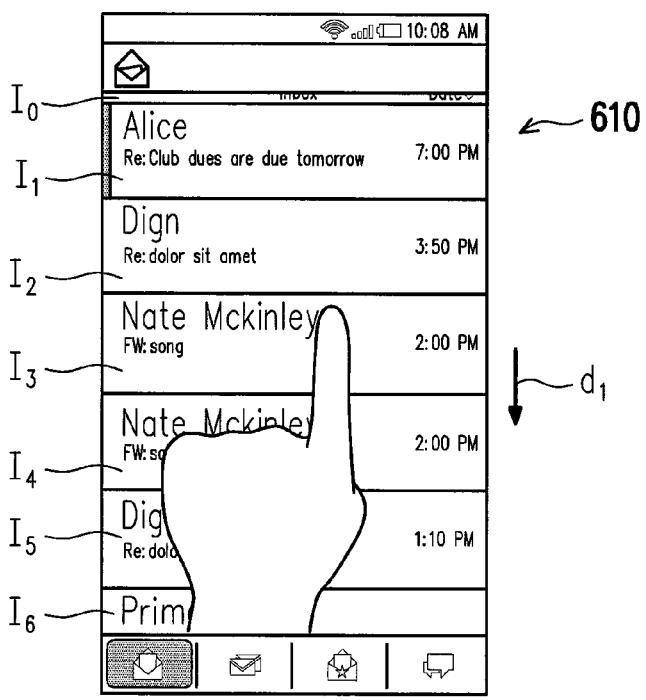
Figure 6E:
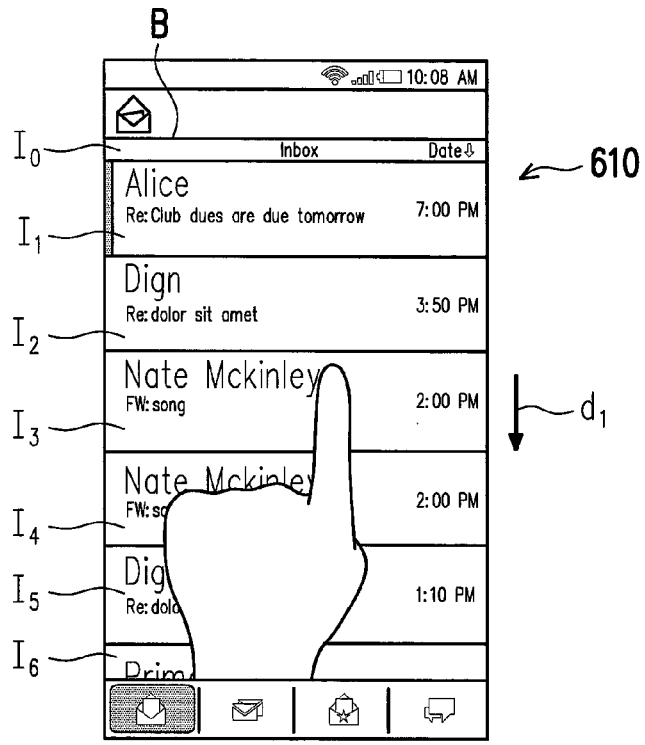
Figure 6F:
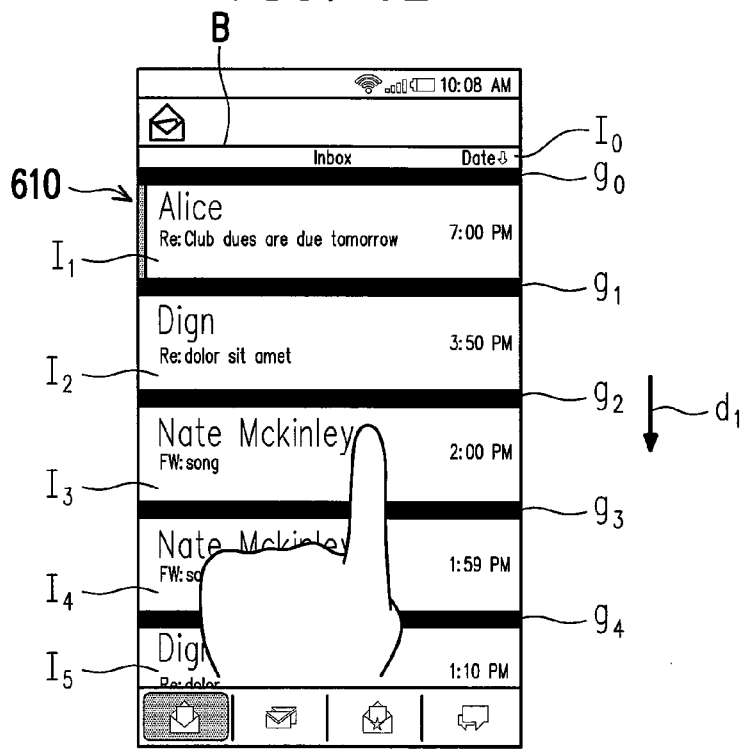

Moreover, referring to FIGS. 6D-6F, the first item $I_0$ of the list 610 is still the title bar. The operations of FIGS. 6D-6E are similar to FIGS. 6A and 6B. In FIG. 6D, in response to the edge B of the list 610 being reached while the finger (object) is still detected on or near the touch screen display 110, the list 610 may moved down continuously, then the item $I_6$ is not displayed and the items $I_0$-$I_5$ are still displayed. And each of the gaps $g_0$-$g_4$ is displayed between the adjacent items $I_0$-$I_5$. After the gaps are generated, the items would move in the second direction, i.e., moving upward, until the gaps disappear (no longer displayed) and return to the pattern illustrated in FIG. 6B. And the movement of the items can be understood via FIGS. 5C-5D.

FIGS. 7A-7C are schematic diagrams of list with a search bar according to some examples of the present disclosure. Herein, the list 710 includes items $I_0$-$I_9$ and the first item $I_0$ of the list 710 is the search bar. In FIG. 7A, the list 710 is not reached the edge. In response to detecting a movement of an object (e.g., a finger), the whole list 710 would be moved to display the edge B of the list 710, as shown in FIG. 7B. Therefore, the search bar (item $I_0$) is displayed. In FIG. 7C, in response to the edge B of the list 710 being reached while the finger generates a movement of sliding downward, the gaps $g_0$-$g_2$ are respectively displayed. When the finger leaves the touch screen display 110, the items $I_1$-$I_6$ would move upward, and the movement of the items $I_0$-$I_9$ can be understood via FIGS. 4C-4D or FIGS. 5C-5D.

FIGS. 8A-8B are schematic diagrams of a list with a digital image according to some examples of the present disclosure. In FIG. 8A, the list 810 includes items $I_0$-$I_5$ and the first item $I_0$ is the digital image. Herein, an edge of the list 810 being reached. In FIG. 8B, in response to detecting a movement of an object (e.g., a finger), i.e. when the user's finger drags down on the touch screen display 110, the gaps $g_0$-$g_1$ are respectively displayed. When the finger leaves the touch screen display 110, the items $I_1$-$I_5$ would move upward, and the movement of the items $I_0$-$I_5$ can be understood via FIGS. 4C-4D or FIGS. 5C-5D.

Moreover, in other examples, when any one of the lists 610, 710 and 810 is moved to the edge of the other side (i.e., the lower edge of the last item of the list), and the object is detected moving upward (the first direction), the item would move upward and generate gaps between adjacent items. Next, the items would be moved downward (the second direction) until the gaps disappear.

In the other examples, the movement of the items in the first direction and the second direction may be both spring motions. Or the movement of either the first direction or the second direction can be spring motions, or none of the movement of the first direction or the second direction is the spring motion.

FIGS. 9A-9E are schematic diagrams illustrating moving items according to some examples of the present disclosure. In this example, a list 910 is displayed on the touch screen display 110. The list 910 includes scrollable items $I_1$-$I_9$, where the item $I_1$ is the first item in the list 910. The list 910 is a mail list, which includes a plurality of items (e.g., a plurality of mails). In this example, an edge B of the list 910 (e.g., the upper edge of the first item $I_1$) has not been reached before the user touches the touch screen display 110. In some examples, the edge B of the list 910 has been reached before the user touches the touch screen display 110.

Figure 9A:
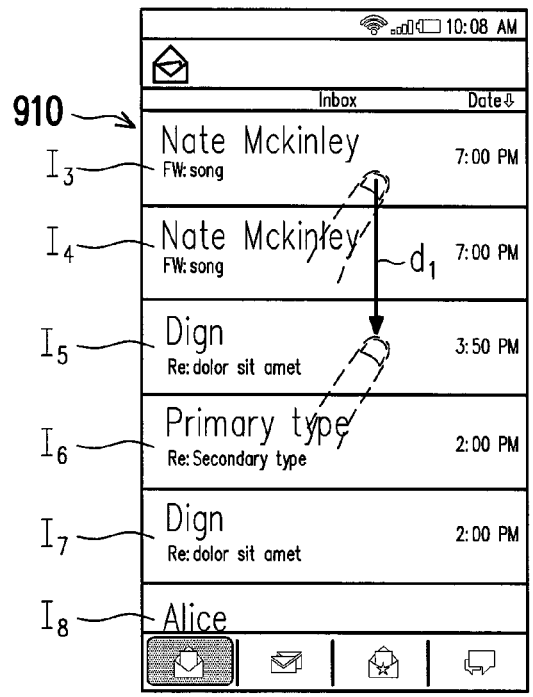
FIGS. 9A-9E are schematic diagrams illustrating moving items according to some examples of the present disclosure.
Figure 9B:
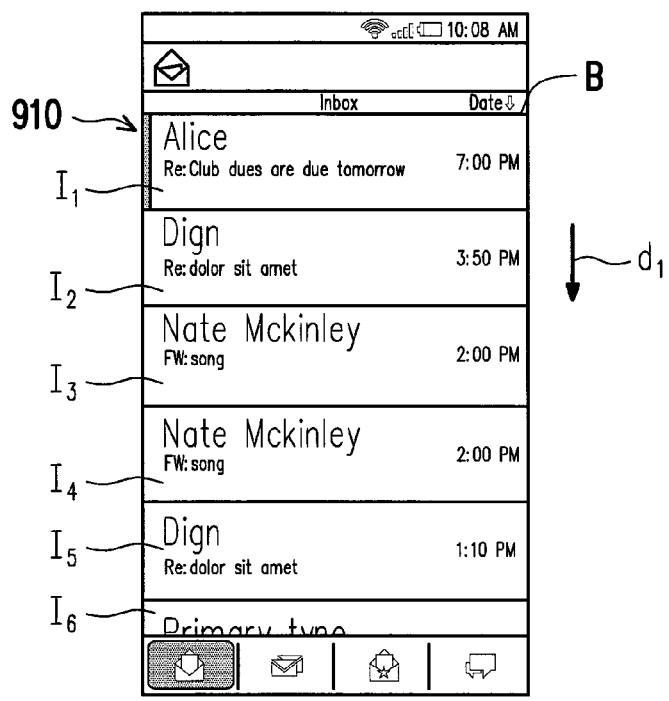

In FIG. 9A, when the user slides on the touch screen display 110 with a sliding speed faster than a predetermined speed and releases (i.e., a flick gesture) in a downward direction, the processor 120 detects the flicking down movement of the object (e.g., the finger) at an initial location corresponding to an initial item $I_3$ on or near the touch screen display 110, and the list 910 is moved in a first direction $d_1$ accordingly. In this example, the first direction $d_1$ is a downward direction.

Figure 9C:
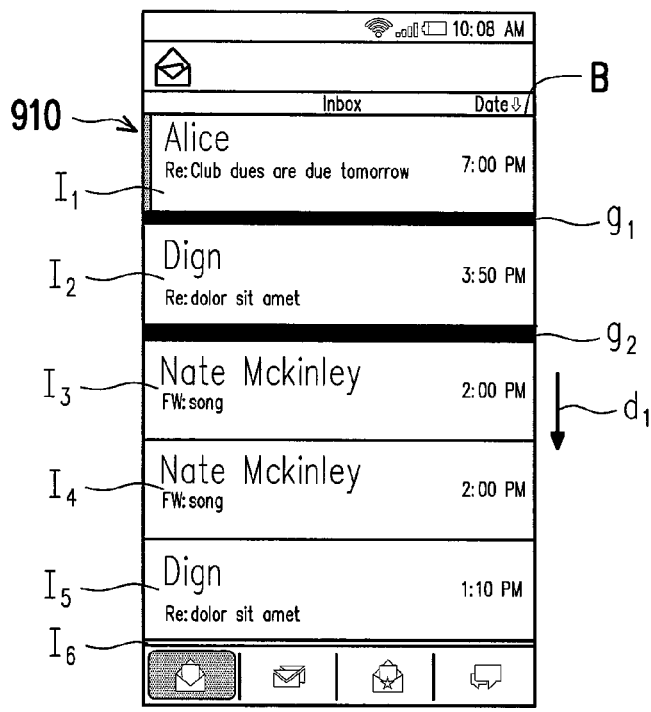
Figure 9D:
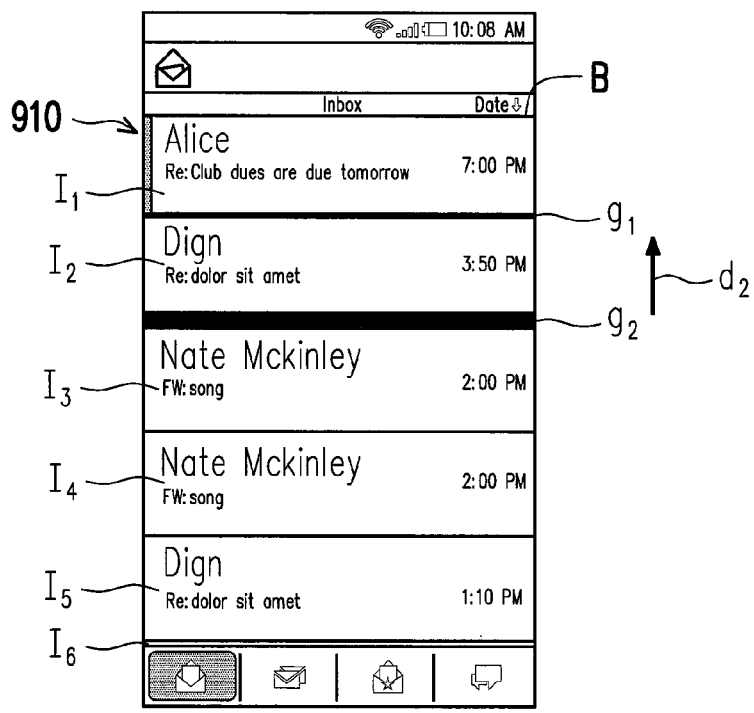

Because of inertia effects, after the edge B of the list 910 is reached (FIG. 9B), the processor 120 continues to move the items $I_2$-$I_6$ in the first direction $d_1$ to display a gap $g_1$ between the adjacent items $I_1$ and $I_2$ and a gap $g_2$ between the adjacent items $I_2$ and $I_3$ (FIG. 9C). The adjacent items $I_1$-$I_2$ and $I_2$-$I_3$ are located between the first item $I_1$ and the initial item $I_3$. Since the first item $I_1$ does not move, no gap is formed outside of the edge B of the list 910.

Figure 9E:
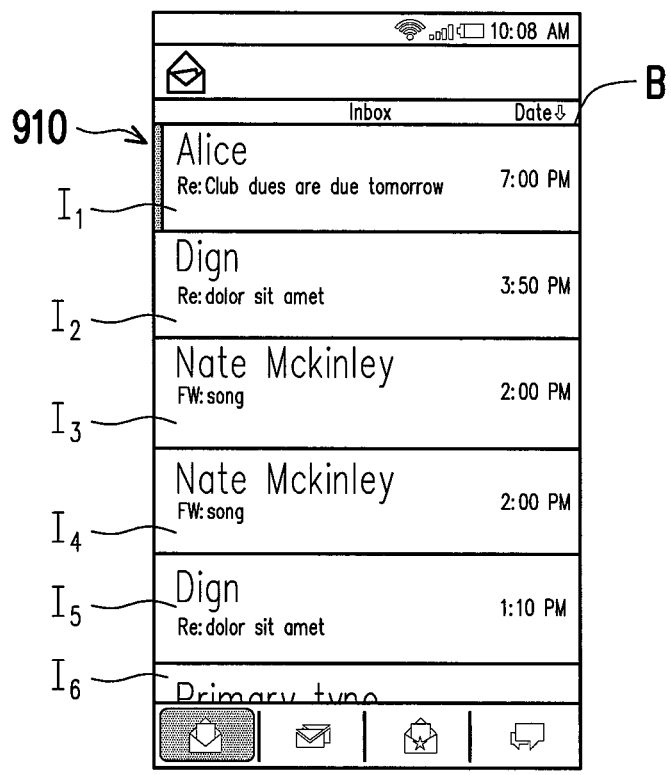

After inertia effects disappear, the processor 120 moves the items $I_2$-$I_6$ back in a second direction $d_2$ (FIG. 9D) until the gaps $g_1$ and $g_2$ are no longer displayed (FIG. 9E). In this example, the second direction $d_2$ is an upward direction opposite to the first direction $d_1$ (i.e., the downward direction).

In some examples, the processors 120 could continue to move the items $I_2$-$I_6$ in the first direction $d_1$ to display gaps between every adjacent items $I_1$-$I_6$, which could be understood via FIG. 6F.

Moreover, in response to detecting that the object is no longer on or near the touch screen display 110, the processor 120 would update the list. Besides, in response to detecting that the object is no longer on or near the touch screen display, the processor 120 may further display an updating hint in a gap among the one or more gaps. For example, the updating hint is displayed in the gap between the first item and the second item.

Figure 10A:
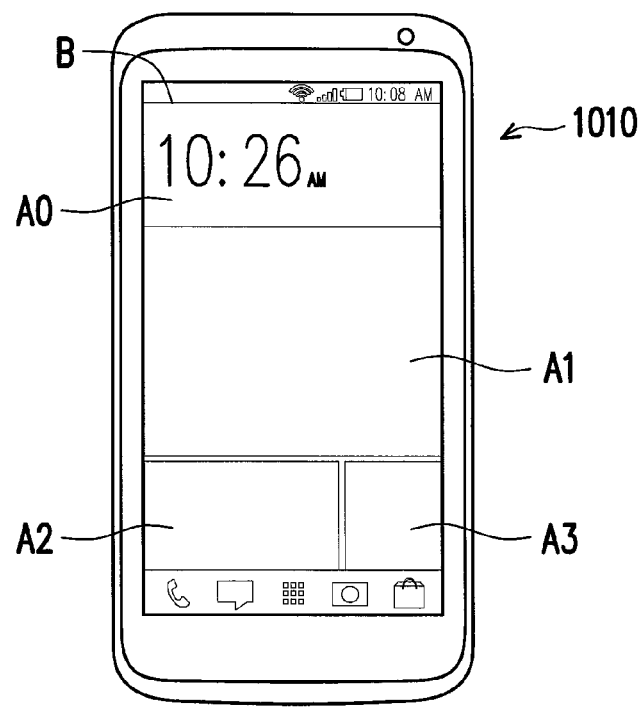
FIGS. 10A-10E are schematic diagrams illustrating moving items according to some examples of the present disclosure.
Figure 10B:
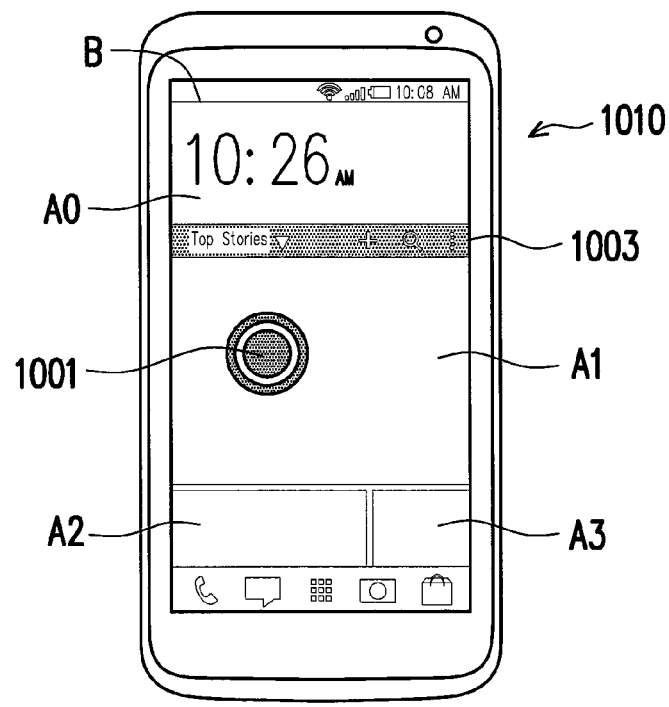
Figure 10C:
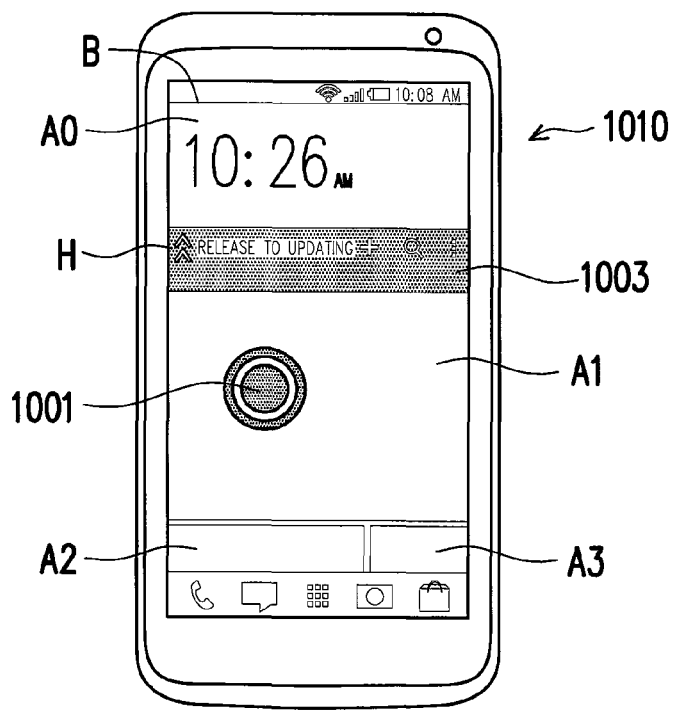
Figure 10D:
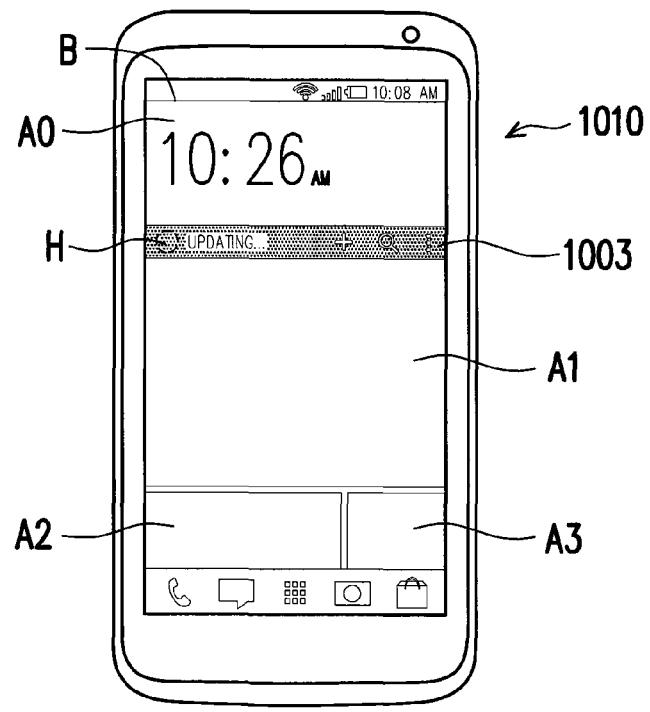
Figure 10E:
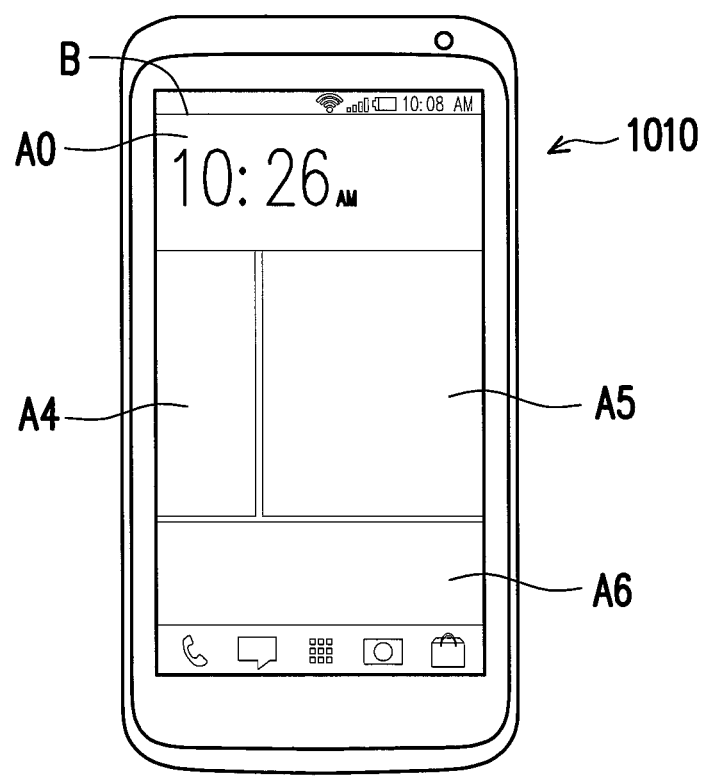

For example, FIGS. 10A-10E are schematic diagrams illustrating moving items according to some examples of the present disclosure. In FIG. 10A, a list 1010 includes items A0-A3, and an edge B of the list 1010 has been reached before the user touches the touch screen display 110. When a movement of an object on or near the touch screen display 110 is detected, such as the finger touches a location 1001 of the touch screen display 110 and drags down, as shown in FIG. 10B, the processor 120 moves the items A1-A3 in a first direction to display a gap 1003. In this example, the first direction is a downward direction. Herein, an option "Top stories" is displayed in the gap 1003. In FIG. 10C, when the object (ex. the finger) is still on the touch screen display 110, the processor 120 continues to move the items A1-A3 in the first direction to have the size of the gap 1003 increase, and a updating hint H is displayed in the gap 1003. Meanwhile, the content "RELEASE TO UPDATING" of the updating hint H may be displayed. In this example, the updating hint H is displayed in the first gap. In some examples, the updating hint H may be displayed in any gap other than the first gap. When the processor 120 detects that the object is no longer on or near the touch screen display 110, in FIG. 10D, the processor 120 would update the list 1010. The content of the updating hint H may be changed from "RELEASE TO UPDATING" to "UPDATING". The processor 120 moves the items A1-A3 in a second direction to have the size of the gap 1003 decrease. In this example, the second direction is an upward direction. After the update is completed, as shown in FIG. 10E, the processor 120 continues to move the items A1-A3 in the second direction until the gap 1010 is no longer displayed and the content of the list 1010 would be changed due to the updating. For example, the items A1-A3 are changed to items A4-A6, and the arrangement manner is different.

The application provides a computer-readable medium which records a computer program to be loaded into an electronic apparatus to execute the aforementioned various steps of the method. The computer program is basically composed of a plurality of program instructions (for example, an organization chart establishing program instruction, a table approving program instruction, a setting program instruction, and a deployment program instruction, etc.), and these program instructions are loaded into the electronic apparatus and executed by the same to accomplish various steps of the method and various functions of the electronic apparatus described above.

In summary, in the aforementioned examples, the items are moved according to the movement of the object. Meanwhile, by displaying gaps between the items, visual effects of sequential movements of the items can be generated with the movement of the object. In addition, after the object stops moving, the moved items are returned to original places. Hence, when the list is being moved, one or more items are simultaneously moved to provide a visual feedback instead of moving the whole list at once.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A method, comprising
   at a computing device with a touch screen display:
   displaying a list of scrollable items on the touch screen display, wherein a first item is first in the list;
   detecting a movement of an object on a touched item of the scrollable items on the touch screen display in a first direction;
   in response to an edge of the list being reached by the first item and the movement being detected, moving one or more of the scrollable items in the first direction to display one or more gaps, wherein each of the one or more gaps is between adjacent ones of the scrollable items from the first item to the touched item, no gap is displayed between adjacent ones of the scrollable items from the touched item to a last item of the list while the object is on the touched item, and no gap is formed outside of the reached edge of the list, and wherein one or more options related to the list of scrollable items is displayed in one of the one or more gaps;
   in response to further movement of the object on the touch screen display in the first direction, replacing at least a portion of the one or more options with an updating hint; and
   in response to detecting the object no longer on the touch screen display, moving the one or more of the scrollable items in a second direction opposite to the first direction until the one or more gaps are no longer displayed, wherein before the one or more gaps are no longer displayed, the moving comprises displaying one or more new, additional gaps between adjacent ones of the scrollable items from the touched item to the last item of the list while moving the one or more of the scrollable items in the second direction after detecting the object no longer on the touch screen display, and updating the list of scrollable items to display different items.

2. The method of claim 1, wherein the list of items is a list of contacts, mails, messages, call history, or files.

3. The method of claim 1, wherein the first direction is a vertical direction, horizontal direction, or a diagonal direction.

4. The method of claim 1, wherein the object is a finger or a stylus.

5. The method of claim 1, wherein the one or more gaps are black, gray, white, or a solid color.

6. The method of claim 1, wherein the one or more gaps are visually distinct from the items.

7. The method of claim 1, wherein a movement of the one or more of the scrollable items in the first and second direction is a spring motion.

8. The method of claim 1, further comprising:
   moving the one or more of the scrollable items one by one in the second direction.

9. An apparatus, comprising:
   a touch screen display;
   one or more processors;
   a memory; and
   one or more programs, wherein the one or more programs are stored in the memory and configured to be installed and executed by the one or more processors, and the one or more programs includes a plurality of instructions to execute the following steps:
   displaying a list of scrollable items on the touch screen display, wherein a first item is first in the list;
   detecting a movement of an object on a touched item of the scrollable items on the touch screen display in a first direction;
   in response to an edge of the list being reached by the first item and the movement being detected, moving one or more of the scrollable items in the first direction to display one or more gaps, wherein each of the one or more gaps is between adjacent ones of the scrollable items from the first item to the touched item, no gap is displayed between adjacent ones of the scrollable items from the touched item to a last item of the list while the object is on the touched item, and no gap is formed outside of the reached edge of the list, and wherein one or more options related to the list of scrollable items is displayed in one of the one or more gaps;
   in response to further movement of the object on the touch screen display in the first direction, replacing at least a portion of the one or more options with an updating hint; and
   in response to detecting the object no longer on the touch screen display, moving the one or more of the scrollable items in a second direction opposite to the first direction until the one or more gaps are no longer displayed, wherein before the one or more gaps are no longer displayed, the moving comprises displaying one or more new, additional gaps between adjacent ones of the scrollable items from the touched item to the last item of the list while moving the one or more of the scrollable items in the second direction after detecting the object no longer on the touch screen display, and updating the list of scrollable items to display different items.

10. A non-transitory computer readable storage medium having stored therein instructions, which when executed by a device with a touch screen display, make the device execute the following steps:

displaying a list of scrollable items on the touch screen display, wherein a first item is first in the list;

detecting a movement of an object on a touched item of the scrollable items on the touch screen display in a first direction;

in response to an edge of the list being reached by the first item and the movement being detected, moving one or more of the scrollable items in the first direction to display one or more gaps, wherein each of the one or more gaps is between adjacent ones of the scrollable items from the first item to the touched item, no gap is displayed between adjacent ones of the scrollable items from the touched item to a last item of the list while the object is on the touched item, and no gap is formed outside of the reached edge of the list, and wherein one or more options related to the list of scrollable items is displayed in one of the one or more gaps;

in response to further movement of the object on the touch screen display in the first direction, replacing at least a portion of the one or more options with an updating hint; and in response to detecting the object no longer on the touch screen display, moving the one or more of the scrollable items in a second direction opposite to the first direction until the one or more gaps are no longer displayed, wherein before the one or more gaps are no longer displayed, the moving comprises displaying one or more new, additional gaps between adjacent ones of the scrollable items from the touched item to the last item of the list while moving the one or more of the scrollable items in the second direction after detecting the object no longer on the touch screen display, and updating the list of scrollable items to display different items.

* * * * *